US006382577B1

(12) United States Patent
McCoy et al.

(10) Patent No.: US 6,382,577 B1
(45) Date of Patent: May 7, 2002

(54) ARTICULATED SUPPORT DEVICE

(75) Inventors: Phillip McCoy, Albion; Donald E. DeWitt, Syracuse; Edward J. Keil, Rome City, all of IN (US); Tracy Tolar, Indian Rocks Beach, FL (US)

(73) Assignee: Group Dekko Services, LLC, Kendallville, IN (US)

( * ) Notice: Subject to any disclaimer, the term of this patent is extended or adjusted under 35 U.S.C. 154(b) by 0 days.

(21) Appl. No.: 09/461,272

(22) Filed: Dec. 15, 1999

(51) Int. Cl.[7] .................................................. E04G 3/00
(52) U.S. Cl. ................... 248/284.1; 248/276.1; 248/920
(58) Field of Search .................. 248/276.1, 284.1, 248/286.1, 921, 281.11, 292.11, 918, 920

(56) References Cited

U.S. PATENT DOCUMENTS 4,703,909 A * 11/1987 Dayton .................. 248/280.11
4,834,329 A * 5/1989 Delapp ........................ 248/183
5,501,420 A * 3/1996 Watt et al. ............. 248/280.11
5,799,917 A * 9/1998 Li ............................ 248/284.1
6,135,405 A * 10/2000 Jones et al. .............. 248/284.1
6,173,933 B1 * 1/2001 Whiteside et al. ....... 248/276.1

* cited by examiner

Primary Examiner—Anita King
Assistant Examiner—Gwendolyn Baxter
(74) Attorney, Agent, or Firm—Taylor & Aust, P.C.

(57) ABSTRACT

A support device for a computer monitor or the like having a support platform and an arm connected to the platform and adapted for attachment to a base structure. Positioning of the support platform is secured by frictional engagement of coil springs on surfaces. Release mechanisms may be activated to change diameters of the coil springs, unsecuring the engagement of the springs against the surfaces. Varying spring constants allows progressive release of more than one spring.

24 Claims, 6 Drawing Sheets

ARTICULATED SUPPORT DEVICE

BACKGROUND OF THE INVENTION

1. Field of the Invention

The present invention relates to a support device for equipment and more specifically to an articulated arm support device for a computer monitor or the like.

2. Description of the Related Art

Computer workstations, personal computers and the like are becoming more and more required in the workplace and the home. Even small business establishments often use computers for record keeping functions. Most clerical functions, in large businesses and in small businesses are performed on computers. Even workers who require a computer for only brief periods each day may have one at their workstation.

In the typical office environment, the space available in which to put the computer components, often times, is limited. While the computer CPU, disk drives and the like can be positioned out of the way, under tables or along side desks, the monitor and keyboard must be conveniently located for ready operation and viewing. This may result in the monitor being placed on a desk, credenza or table for easy viewing, with the keyboard positioned directly in front of the monitor, on the same desk, credenza or table.

When not in use, a monitor and keyboard occupy areas of work surface that otherwise could be used for other tasks. In a small office or work environment, available work surface may be extremely limited. Therefore, it would be advantageous to move the computer components out of the way when not in use. While many office furniture arrangements include keyboard trays, supports and the like for moving the keyboard out of the way, typically under the desk surface, often the monitor remains on the desk, even when not in use. Since the monitor is normally the single largest piece of computer equipment in a typical office set-up, much work area could be gained if the monitor could be moved out of the way when not in use. The problem becomes even more critical as larger screen monitors gain in popularity.

Other equipment besides computers are provided in offices and other work places for occasional, but not continuous use. For example, video tape players and televisions or monitors are used for customer information programs in some commercial establishments. These may be placed on a table or the like, for ready use when needed. However, use may be once a day, or even less. Again, work surface area dedicated to such devices may be wasted during a good portion of the working day. The work surface area could be put to advantageous use if a convenient device were available to move the equipment out of the way when not in use, and quickly move it in to a useful position when the equipment is needed.

Known types of articulating arms have provided some flexibility for office equipment arrangement, but most are not convenient in use. Wing nuts, thumb screws, lever topped nuts and various other mechanisms are known for securing the position of support devices. Many are not convenient to use and do not secure the device adequately during use. Rotating a handle, lever or knob to tighten a nut is inconvenient. If inadequately tightened, the position may change during use. Some users may not be capable of tightening the device adequately, and others may over-tighten the mechanism, causing damage to the mechanism and making it difficult for others to loosen the mechanism. Further, the mere act of tightening the mechanism may cause the support to move from the desired position. After adjusting the device, and tightening as required, the user may find it is not positioned as desired.

Clearly, benefits would be gained from a device which could support equipment such as a computer monitor in a useful operating position, and move the equipment out of the way when not in use, thereby freeing otherwise wasted work surface area. Further benefits would be obtained from such a device if locking and release of the pivotal features for such a device are accomplished quickly and easily, with minimal effort.

SUMMARY OF THE INVENTION

The present invention provides an articulated support device for computer monitors or the like. A support platform is provided for holding the monitor. A support arm is attached at one end to the support platform and is adapted at the other end for attachment to a base unit, such as a wall, modular divider unit or the like. In one form of the invention, a dual coil spring assembly is associated with the support member, and includes a first coil spring and a second coil spring disposed around the outside of a tube. One end of each coil spring is attached to a yoke, and the other end of each coil spring releasably holds the tube, by frictional engagement of the inside of the coil spring against the outside of the tube. A counterbalancing spring is provided inside the tube.

The support platform includes a dual coil spring assembly similar to the first dual coil spring assembly, two release paddles and a linkage assembly including a pulley system and cables that link the release paddles to each of the dual coil spring assemblies. Either or both paddles may be activated, to move yokes of the dual spring assemblies, thereby expanding the inside diameters of the springs and releasing the binding engagement of the springs on the tubes. By utilizing different spring constants in the dual spring assemblies, activation of each can be made to occur in series. Therefore, partial movement of the paddles will activate only one of the dual coil spring assemblies, and full activation of the paddles will release both dual coil spring assemblies. Upon releasing the paddles, the dual coil spring assemblies grasp the respective tubes about which the springs are wrapped, securing the support platform in the desired position.

In a second form of the invention, single coil springs are provided in each coil spring assembly. The coil springs frictionally engage fixed members of the support arm, and are attached to toggle wheels. Activation of the release paddles rotates the toggle wheels, turning the springs to release the frictional engagement between the springs and the fixed members of the support arm. Upon releasing the paddles, the toggle wheel is rotated to its original position, and the coil springs again engage the fixed members.

An advantage of the present invention is the convenient adjustment of a support platform in height and angular orientation.

Another advantage of the present invention is providing a support device which is convenient and easy to use.

Yet another advantage of the present invention is providing a support device which is easily adjustable yet securely locked in position once adjusted, and which can be operated with minimal inconvenience.

A still further advantage of the present invention is providing an adjustable support device having a high degree of adjustability, ease of operation for both right-handed and left-handed users, which rigidly locks in position once adjusted without strain or effort on the part of the user.

BRIEF DESCRIPTION OF THE DRAWINGS

The above-mentioned and other features and advantages of this invention, and the manner of attaining them, will become more apparent and the invention will be better understood by reference to the following description of an embodiment of the invention, taken in conjunction with the accompanying drawings, wherein.

Corresponding reference characters indicate corresponding parts throughout the several views. The exemplifications set out herein illustrates one preferred embodiment of the invention, and a modification thereof, and such exemplifications are not to be construed as limiting the scope of the invention in any manner.

DETAILED DESCRIPTION OF THE INVENTION

Figure 1:
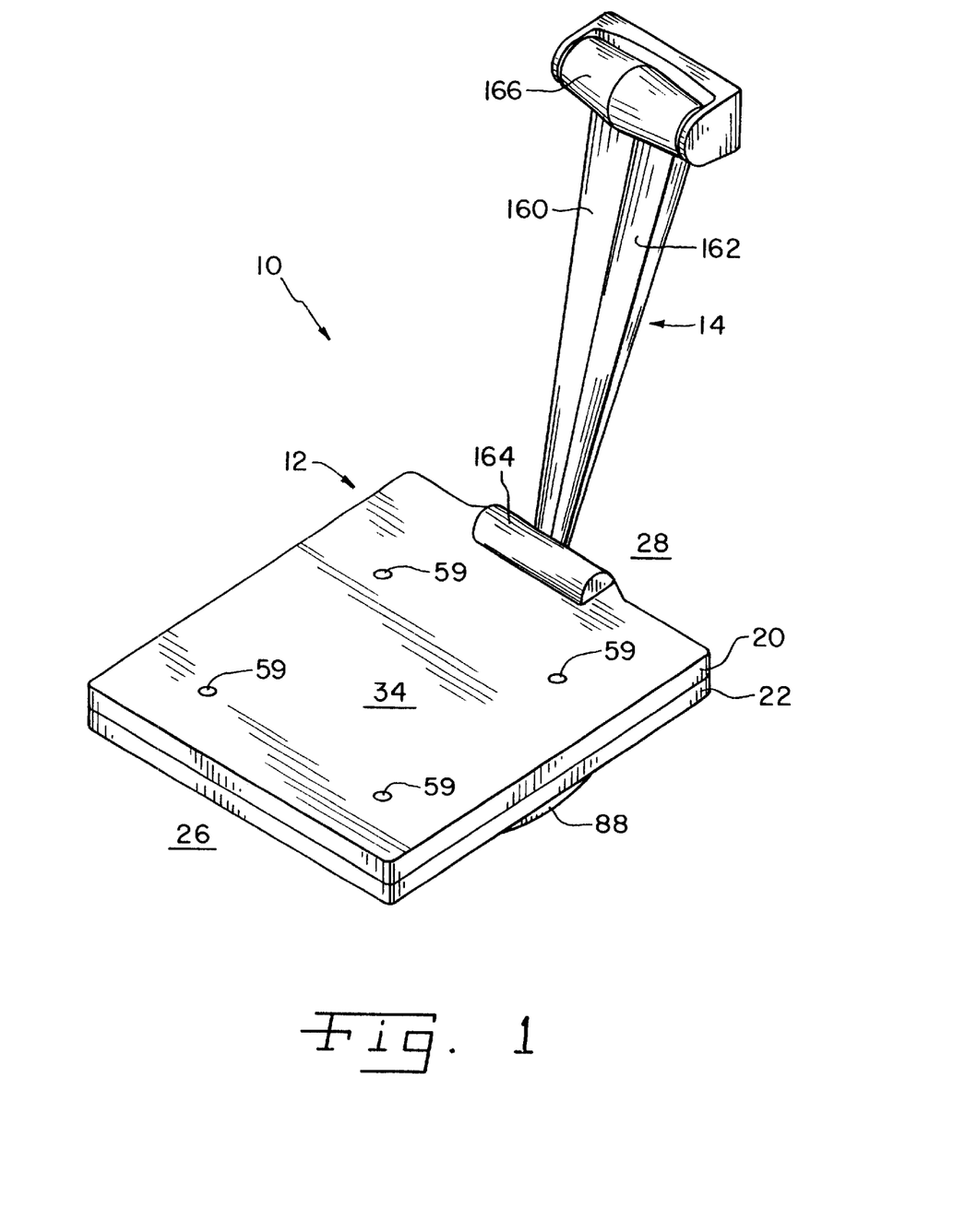
FIG. 1 is a perspective view of an articulated support device of the present invention.

Referring now more specifically to the drawings, and to FIG. 1 in particular, numeral 10 designates an articulated support device of the present invention. Support device 10 is configured for holding a computer monitor, or the like.

Support device 10 includes, generally, a support platform 12 adapted for holding a computer monitor. A support arm 14 is disposed between support platform 12 and a base unit such as a wall, modular divider or other body to which the support device is attached.

Support platform 12 includes an upper body piece 20 and a lower body piece 22, of complimentary shape to define an internal cavity 24. Each of upper body piece 20 and lower body piece 22 has a user side 26, and an attachment side 28. References hereinafter with respect to terms such as "front", "back", "left" and "right" shall be made from the perspective of a user positioned with user side 26 being the side nearest the user, and attachment side 28 being farthest from the user.

Figure 3:
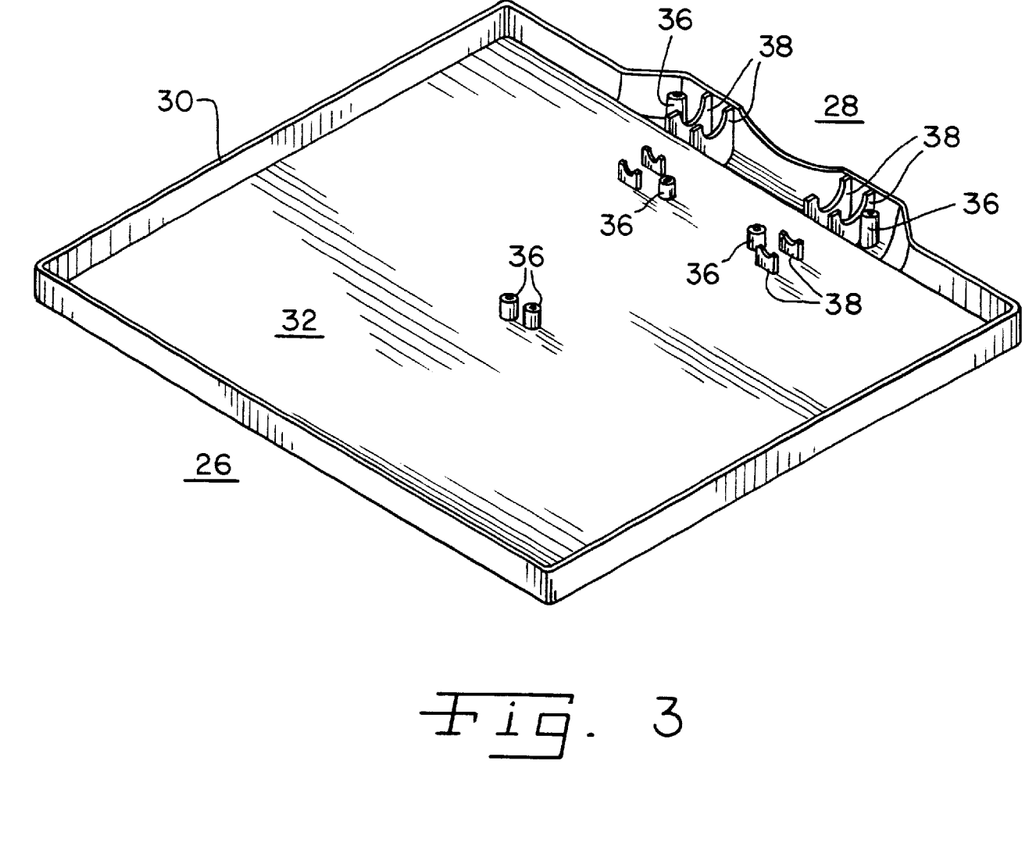
FIG. 3 is a perspective view of the underside of the top piece for the support device shown in FIG. 1.

Upper body piece 20, which is shown inverted in FIG. 3, includes an outer wall 30 and a central plate 32 defining a substantially flat surface 34 (FIG. 1) on which a computer monitor or other device may be placed. The underside of central plate 32 includes a plurality of stand offs 36 and/or positioners 38 useful in mating the upper body piece 20 to the lower body piece 22 when assembled. Stand offs 36 and positioners 38 are designed to partially engage (positioners 38) components of the lower body piece 22 or mate with (stand offs 36) components of the lower body piece 22. In securing the upper body piece 20 to the lower body piece 22, one or more of stand offs 36 or positioners 38 may be threaded to receive screws, not shown, extended upwardly through the lower body piece 22.

Figure 2:
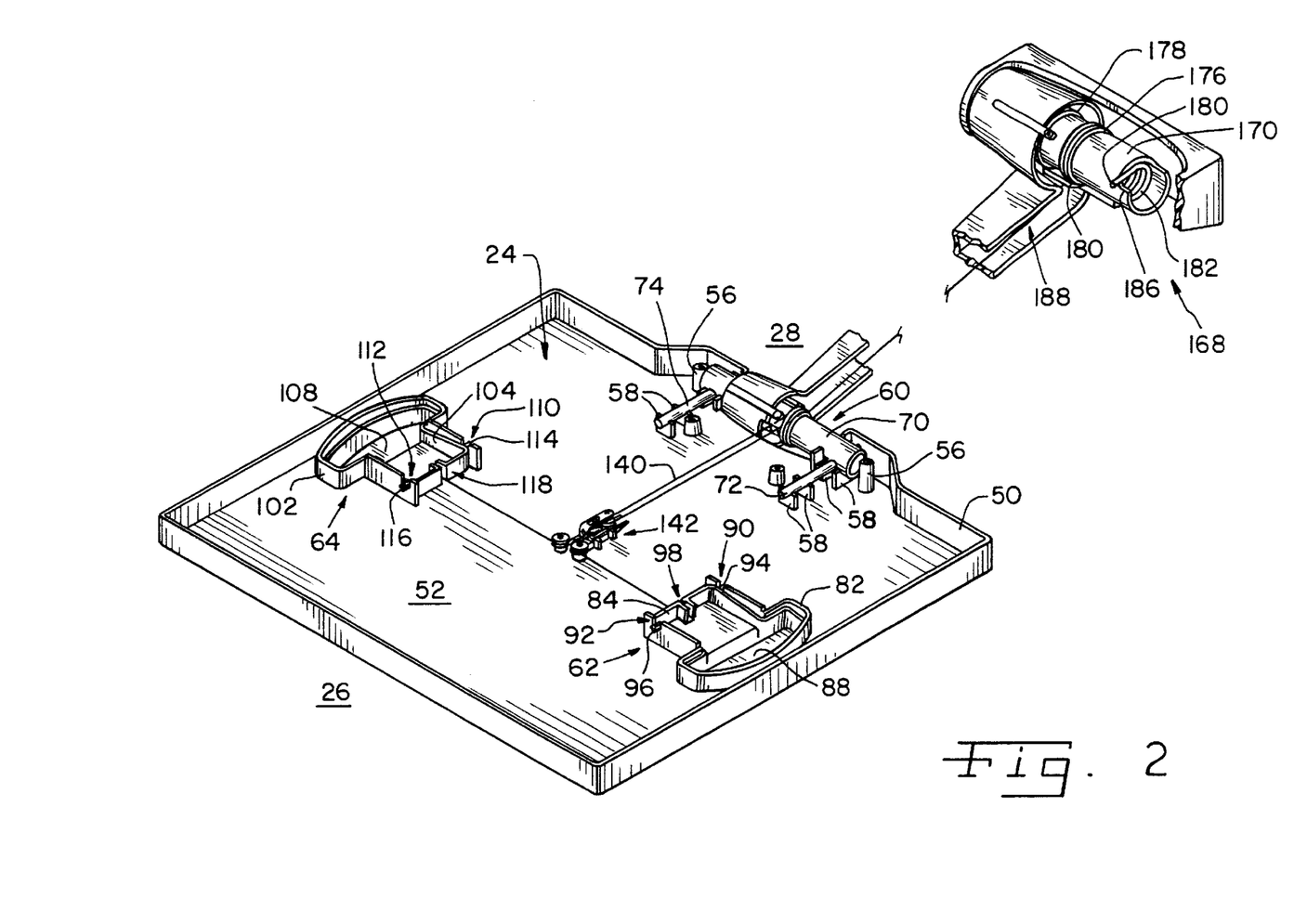
FIG. 2 is a perspective view of the articulated support device of FIG. 1, shown with the top thereof removed.

Referring now to FIG. 2, lower body piece 22 includes an outer wall 50 shaped complimentary to outer wall 30 of upper body piece 20. A floor 52 is disposed within outer wall 50. Outer walls 30 and 50, central plate 32 and floor 52, when assembled, define cavity 24. A plurality of stand offs 56 and positioners 58 are disposed on floor 52 of lower body piece 22. One or more of stand offs 56 may define central openings therethrough, through which screws or the like may be extended to be receivingly engaged by complimentary stand offs 36 of upper body piece 20, for securing upper body piece 20 on lower body piece 22. Further, openings 59 may be provided through to surface 34, for securing a monitor or the like on surface 34 with screws extending through support platform 12. Together with positioners 38 of upper body piece 20, positioners 58 of lower body piece 22 are located to engage components of the support platform to be described subsequently.

Disposed within cavity 24, between upper body piece 20 and lower body piece 22, are a locking pivotal assembly 60 and first and second release mechanisms 62 and 64, respectively. Locking pivotal assembly 60 is the connecting structure between support platform 12 and support arm 14. When released, locking pivotal assembly 60 allows relative rotational movement between support platform 12 and support arm 14. When not released, locking pivotal assembly 60 secures the relative positions of support platform 12 and support arm 14, and, under normal conditions, prevents relative rotational movement therebetween. Release mechanisms 62 and 64 are used to release locking pivotal assembly 60, to allow relative rotational movement between support platform 12 and support arm 14.

Figure 4:
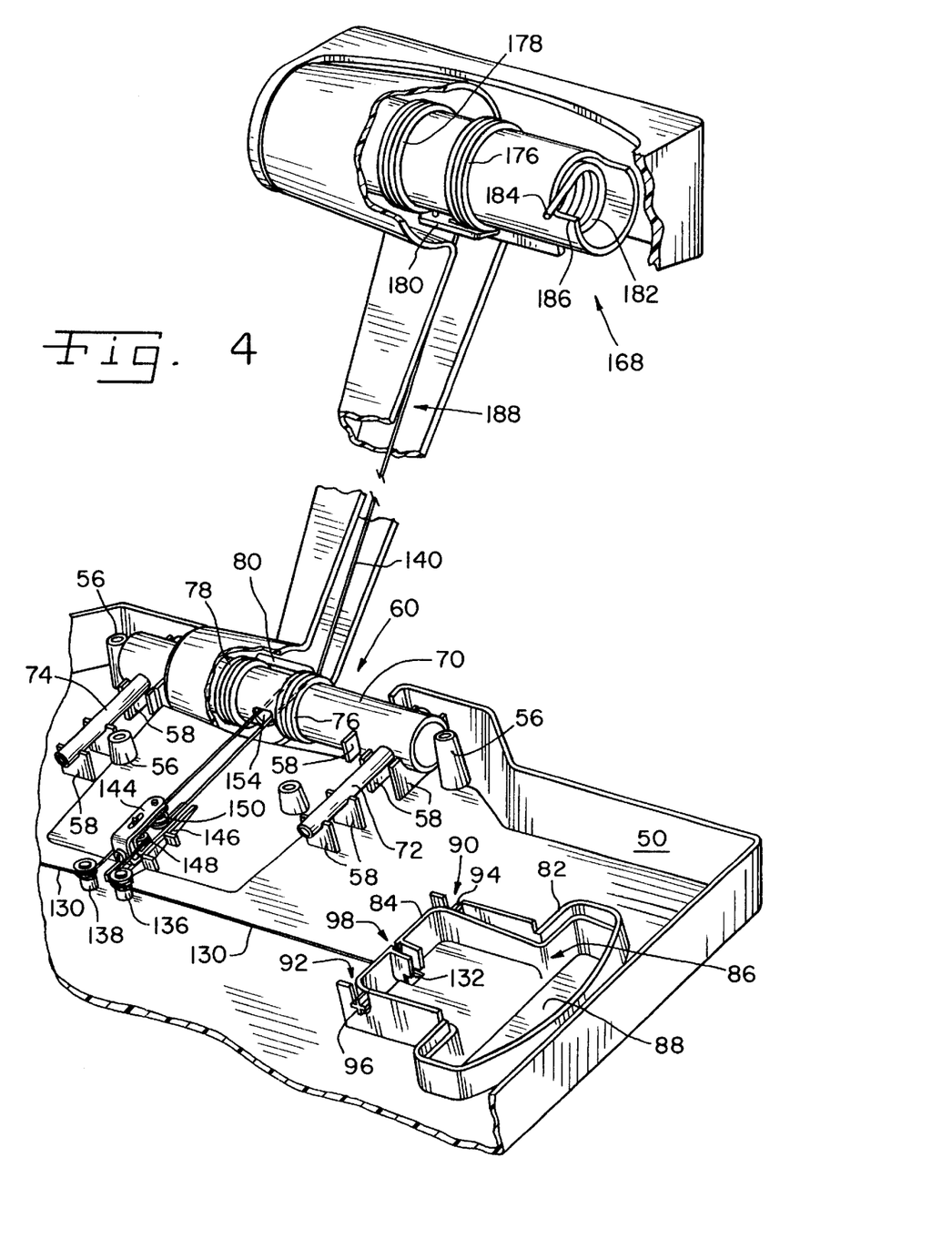
FIG. 4 is an enlarged fragmentary view of the support device shown in FIG. 2.

Locking pivotal assembly, 60 shown most clearly in the enlarged view of FIG. 4, includes a tube 70 having first and second arms 72 and 74 received between complimentary positioners 38 and 58 of upper body piece 20 and lower body piece 22, respectively. Tube 70 is rotatably received in support arm 14, and is positioned against lateral movement between stand offs 36 and 56 of upper body piece 20 and lower body piece 22, respectively. Thus, tube 70 is fixed within cavity 24, but may rotate relative to support arm 14. A first coil spring 76 and a second coil spring 78 are disposed around tube 70. In the relaxed positions of first coil spring 76 and second coil spring 78, the internal diameters of each is less than the outer diameter (i.d.) of tube 70, such that, when assembled on tube 70, neither coil spring 76 nor coil spring 78 can fully relax. Each coil spring 76 and coil spring 78 instead engages the outer surface of tube 70 in a tightly gripped manner such that, without excessive force, tube 70 will not rotate within first outer coil spring 76 or second outer coil spring 78. One end of first coil spring 76 is attached to tube 70 and the second end of first outer coil spring 76 is attached to a yoke 80. Similarly, one end of second coil spring 78 is attached to tube 70 and the other end of second coil spring 78 is attached to yoke 80. Yoke 80 is shown in enlarged view in FIG. 5, and will be described in greater detail herein after.

First release mechanism 62 includes a shaped housing 82 extending upwardly from floor 52. A release paddle 84 is a body shaped to fit within housing 82, while moving upwardly and downwardly therein, in a manner to be described. Within the confines of housing 82 floor 52 defines an opening (not shown). A finger tab 88 (FIG. 1) of release paddle 84 extends downwardly through opening 86. At the inner ends of housing 82, slots 90 and 92 are defined for receiving pivots 94 and 96 of release paddle 84. Thus, finger tab 88 and the outer end of release paddle 84 can move upwardly and downwardly, pivoting on the pivots 94 and 96 in slots 90 and 92. The inner edge of release paddle 84 defines a cable slot 98.

Second release mechanism 64, (FIG. 1), is similar to first release mechanism 62, includes a shaped housing 102 extending upwardly from floor 52. A release paddle 104 is a body shaped to fit within housing 102. Within the confines of housing 102 floor 52 defines an opening (not shown). A finger tab 108 of release paddle 104 extends downwardly through the opening similarly to that described for release mechanism 62. At the inner ends of housing 102, slots 110 and 112 are defined for receiving pivots 114 and 116 of release paddle 104. Thus, finger tab 108 and the outer end of release paddle 104 can move upwardly and downwardly, pivoting on pivots 114 and 116 in slots 110 and 112. The inner edge of release paddle 104 defines a cable slot 118.

Figure 5:
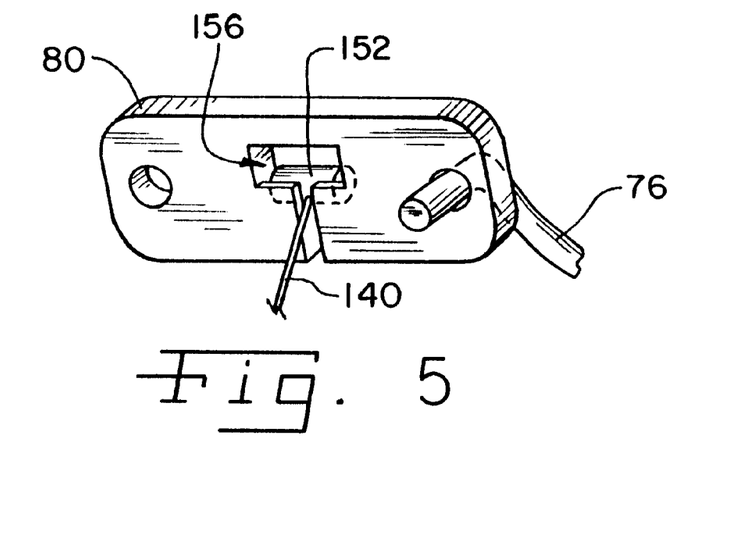
FIG. 5 is an enlarged, perspective view of a yoke, cable and spring assembly of the keyboard support device shown in the previous Figures.

A first cable 130 is disposed between first release mechanism 62 and second release mechanism 64. A first cable retainer 132 is attached to one end of cable 130, for securing cable 130 in slot 98 of first release mechanisms 62. A second cable retainer (not shown) secures the opposite end of cable 130 in slot 118 of second release mechanism 64. First and second capstans 136 and 138 are disposed inwardly from first and second release mechanisms 62 and 64, respectively. Cable 130 extends from release mechanisms 62 and 64 on the side of capstans 136 and 138 toward user side 26, and forms a loop between capstans 136 and 138 extending toward support arm 14. A second cable 140 is attached to yoke 80, and forms a loop extending toward the loop of cable 130. A cable link 142 interconnects the looped portions of cable 130 and cable 140. A U-shaped bracket 144 is disposed within a slide 146 on floor 52. First and second pulleys 148 and 150, respectively, are disposed in bracket 144. Pulley 148 and pulley 150 are each rotational about vertical axes relative to floor 52. The looped portion of cable 130 is disposed around pulley 148. One end of cable 140 is attached to yoke 80 by a cable retainer 152 (FIG. 5). The looped portion of cable 140 extends through an opening 154 in tube 70 and is disposed about pulley 150. The remaining length of cable 140 passes through an opening 156 in yoke 80, and extends through support arm 14, for attachment thereto as will be described hereinafter.

Support arm 14 includes a first housing member 160 and a second housing member 162. An enlarged lower portion 164 defined by first housing member 160 and second housing member 162 encloses locking pivotal assembly 60 described previously. An enlarged upper portion 166 defined by housing members 160 and 162 encloses a second locking pivotal assembly 168. The length of arm 14 between enlarged lower portion 164 and enlarged upper portion 166 is selected to achieve the desired distance of separation between the upper most and lower most positions for support platform 12.

Second locking pivotal assembly 168 includes a tube 170 rotatably received in support arm 14. A first coil spring 176 and a second coil spring 178 are disposed around tube 170. In the relaxed positions of first outer coil spring 176 and second outer coil spring 178, the diameters of each is less than the outer diameter of tube 170, such that, when assembled on tube 170 neither coil spring 176 nor coil spring 178 can fully relax. Each coil spring 176 and coil spring 178 instead engages the outer surface of tube 170 in a tightly gripped manner such that without excessive force, tube 170 will not rotate within first coil spring 176 or second coil spring 178. One end of first coil spring 176 is attached to tube 170 and the second end of first outer coil spring 176 is attached to a yoke 180. Similarly, one end of second outer coil spring 178 is attached to tube 170 and the other end of second outer coil spring 178 is attached to yoke 180. Yoke 180 is similar to yoke 80, described previously.

A counterbalance spring 182 is disposed around the inside diameter of tube 170. An end 184 of counterbalance spring 182 is attached to tube 170 by receipt against a shoulder 186 formed in tube 170.

A hollow space 188 is defined within housing members 160 and 162. The end of cable 140 extending through opening 156 of yoke 80 extends through hollow space 188, and is connected to yoke 180.

In the use and operation of an articulating support device according to the present invention, a computer monitor or similar device is placed on surface 34, and may be secured thereto by screws extending through openings 59. To adjust the relative height and/or angular position of the monitor, first release mechanism 62 or second release mechanism 64 is operated by pushing upwardly on release paddle 84 or release paddle 104. Upward movement on either paddle, or both, causes the activated panel to pivot about pivot 114 or 116. Movement in this manner causes the inner edge of the paddle to tilt, thereby causing some dislocation of cable 130 and a shortening in the length of the loop in cable 130 between capstans 136 and 138. Through the interconnection of cables 130 and 140 by cable link 142 movement of either or both of release paddles 104 and 84 draws on yoke 80, expanding the inner diameter of first coil spring 76 and second coil spring 78. The support platform may thus be pivoted about the horizontal axis defined by tube 70.

Advantageously, coil springs 76 and 78 have a lower spring constant than coil springs 176 and 178. In this manner, locking pivotal assembly 60 is released through partial activation of release paddles 84 and/or 104. Further activation of release paddles 84 and/or 104 additionally releases second locking pivotal assembly 168. First coil spring 176 and second coil spring 178 are expanded, releasing the mechanism to pivot about the axis defined by tube 170.

Therefore, the user can choose to pivot only about the axis of first locking pivotal assembly 60, to essentially change the angle of support platform 12, without substantially changing the height of the monitor. A slight change of angle for a monitor may reduce glare or improve comfort in the viewing angle. Upon further depression of release paddles 84 and/or 104 the user can select to adjust the relative height and angular orientation simultaneously.

As mentioned previously, either first release mechanism 62 or second release mechanism 64 can be used to release locking pivotal assembly 60 or locking pivotal assembly 160. Alternatively, both first release mechanism 62 and second release mechanism 64 can be activated simultaneously. When both are activated simultaneously, either need be activated only half the distance as if only one were being activated.

With support platform 12 being pivotal about locking pivotal assembly 60 relative to support arm 14, and support arm 14 being pivotal about second locking pivotal assembly 168 relative to a base unit or wall to which support device 10 is attached, the height and angular orientation of a monitor or the like positioned on support device 10 is virtually infinitely adjustable between the upper and lower extremes. By grasping each side of support platform 12, and depressing one or both of release paddles 84 and 104, while simultaneously rotating and moving support platform 12 to a preferred position, both the elevation and angular orientation of a monitor on support platform 12 can be adjusted simultaneously. Support platform 12 is then secured in the desired position merely by releasing depressed release paddles 84 and/or 104. Since the act of "locking" platform 12 can be performed while continuing to hold the platform in the desired position, firmly with both hands, it is unlikely that the position will move while platform 12 is being locked in position. This is of particular advantage over devices that require the turning of a knob or lever to secure the device in position.

Since articulating support device 10 can be adjusted quickly and easily, a user is encouraged by it's simplicity of operation to use it. When a monitor or the like disposed thereon is not being used, support platform 12 can be stored out of the way, by simply grasping both sides of support platform 12, depressing on or both of first release mechanism 62 and second release mechanism 64, and pushing support platform 12 to its storage position.

Figure 6:
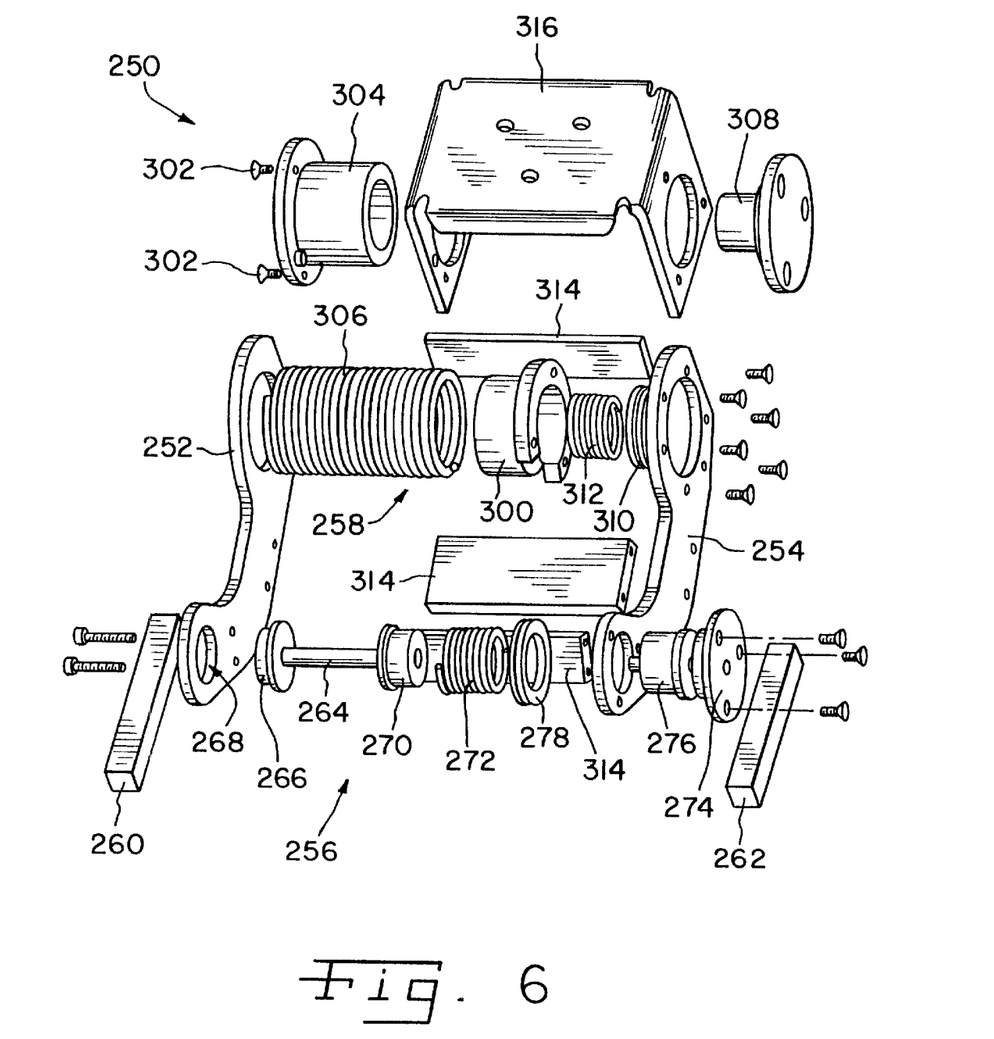
FIG. 6 is an exploded view of a modified embodiment for the support arm of the present invention.

With reference now to FIG. 6, the internal components of a modified support arm 250 are shown in an exploded view. Modified support arm 250 includes a first side bar 252 and a second side bar 254. A lower first locking pivotal assembly 256 and an upper second locking pivotal assembly 258 are disposed between first side bar 252 and second side bar 254, near the ends thereof. Attachment fingers 260 and 262 are provided at the lower ends of first side bar 252 and second side bar 254 for attaching modified support arm 250 to support platform 12.

Figure 7:
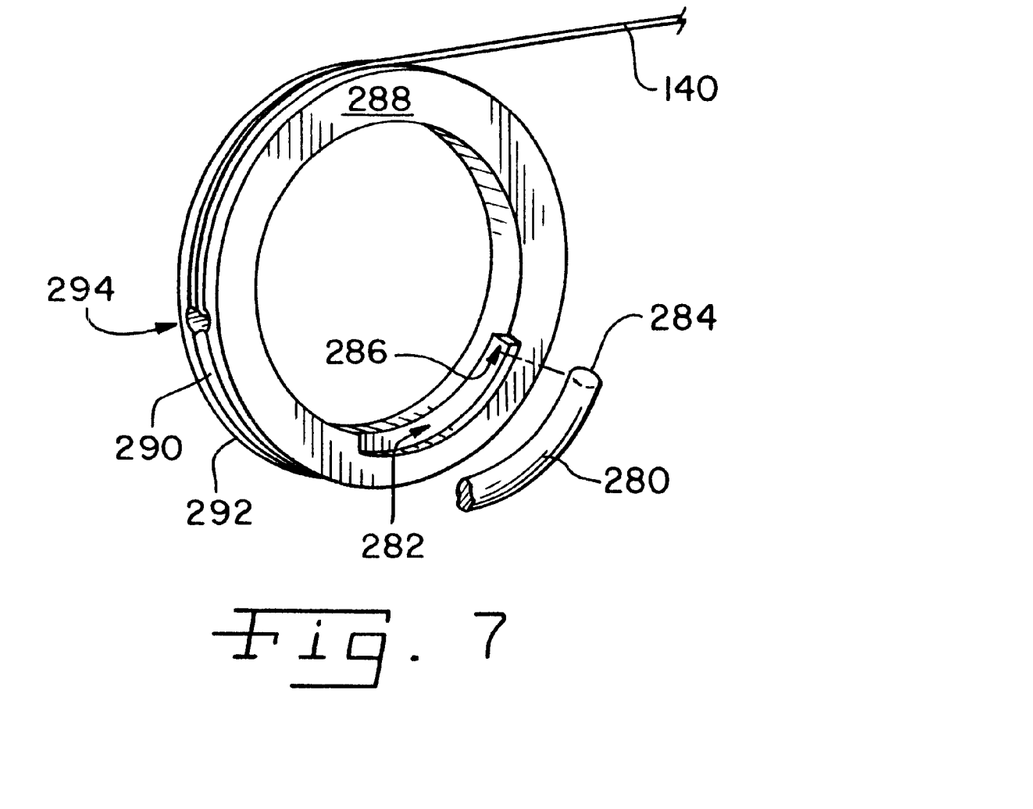
FIG. 7 is an enlarged perspective view of a toggle wheel, cable and spring assembly for the modified embodiment shown in FIG. 6.

Lower first locking assembly 256 includes a shaft 264 with a hub 266 disposed at one end thereof and received in an opening or hole 268 of first side arm 252. A hub 270 is disposed on the end of shaft 264 opposite the end of having hub 266. A first coil spring 272 is disposed on and attached to hub 270. A plug 274, secured by screws 302, extends through second side bar 254 and includes a hub portion 276. Coil spring 272 is disposed on hub portion 276 of plug 274. The inner diameter of first coil spring 272 is selected with respect to the outside diameter of hub portion 276 such that the i.d. of spring 272 is slightly less than the o.d. of hub 276, and spring 272 frictionally engages the outer surface of hub 276 in its relaxed position. A toggle wheel 278 of lower first locking pivotal assembly 256 is received on hub portion 276 of plug 274, and is connected to first coil spring 272. Toggle wheel 278 is shown enlarged in FIG. 7. An end 280 of first coil spring 272 rests in a chamfered edge section 282 of toggle wheel 278, with a tip 284 of spring 272 disposed against an abutment 286 on toggle wheel 278. Chamfered edge section 282 extends angularly downward from a side surface 288 of toggle wheel 278, terminating at abutment 286. A groove 290 is disposed circumferentially around outer edge 292 of toggle wheel 278. An end of cable 140 partially wraps toggle wheel 278, and is disposed in groove 290. Cable retainer 152 of cable 140 is received in a slot 294. Activation of release mechanism 62 and/or 64 rotates toggle wheel 278, releasing the frictional engagement of spring 272 on hub portion 276.

Upper second locking pivotal assembly 258 includes a hub 300 attached to the inner side of second side bar 254 by a plurality of screws 302. A hub 304 extends through first side bar 252 and is attached thereto by a further plurality of screws 302. A counterbalance spring 306 is disposed on hubs 300 and 304. A smaller hub 308 extends through second side bar 254, and has disposed thereon a second toggle wheel 310, similar to toggle wheel 278. A coil spring 312 is connected to toggle wheel 310 and frictionally engages smaller hub 308. The end of cable 140 opposite the end connected to toggle wheel 278 partially surrounds and is connected to toggle wheel 310.

Modified support arm 250 further includes a plurality of spacers 314 disposed between first side bar 252 and second side bar 254. A bracket 316 is disposed between the upper ends of first side bar 252 and second side bar 254. Housings surrounding the mechanism shown in FIG. 6 are not shown.

Operation of modified support arm 250 is similar to that described previously for the first embodiment of the present invention. One or both of release mechanisms 62 and 64 are activated to rotate toggle wheels 278 and 310, unsecuring the frictional engagement of the locking mechanism.

Various additional modifications can be made to the present invention. For example, the size and shape of support platform 12 can be changed for adequately retaining thereon different size equipment. Ridges can be provided at the perimeter of surface 34 to prevent items from sliding off. The location of release mechanisms 62 and 64 can be selected for convenience of operation. For some purposes, it may be advantageous to use only a single release mechanism at the front of support platform 12.

While this invention has been described as having a preferred design, and several modifications have been described, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An articulated support device for attachment to a base structure, comprising:

a support platform;

a support arm having a first end adapted for pivotally attaching said support arm to said support platform, and a second end adapted for pivotally attaching said support arm relative to the base structure;

a locking pivotal assembly including a coil spring having a locked position for restricting pivotal movement of said support platform relative to the base structure, and an unlocked position permitting pivotal movement of said support platform relative to the base structure; and a release mechanism operable to adjust said coil spring from said locked position to said unlocked position.

2. The support device of claim 1, further comprising:

a first locking pivotal assembly at said first end of said support arm, said first locking pivotal assembly including a first coil spring having a first locked position for restricting pivotal movement of said support platform relative to said support arm, and a first unlocked position permitting pivotal movement of said support platform relative to said support arm;

a second locking pivotal assembly at said second end of said support arm, said second locking pivotal assembly including a second coil spring having a second locked position for restricting pivotal movement of said support arm relative to the base structure, and a second unlocked position permitting pivotal movement of said support arm relative to the base structure;

a first release mechanism operable to adjust said first coil spring from said first locked position to said first unlocked position; and operable to adjust said second coil spring from said second locked position to said second unlocked position.

3. The support device of claim 2, wherein:

said first locking pivotal assembly includes a first tube defining a first axis about which said support platform is pivotal relative to the base structure, said first coil spring is disposed around said first tube, an internal diameter of said first coil spring in a relaxed condition is less than an outside diameter of said first tube, a first end of said first coil spring is attached to said first tube; and a second end of said first coil spring is connected to said release mechanism; and said second locking pivotal assembly includes a second tube defining a second axis about which said support platform is pivotal relative to the base structure, said second coil spring is disposed around said second tube, an internal diameter of said second coil spring in a relaxed condition is less than an outside diameter of said second tube, a first end of said second coil spring is attached to said second tube; and a second end of said second coil spring is connected to said release mechanism.

4. An articulated support device for attachment to a base structure, comprising:

a support platform;

a support arm having a first end adapted for pivotally attaching said support arm to said support platform, and a second end adapted for pivotally attaching said support arm relative to the base structure;

a first locking pivotal assembly at said first end of said support arm, said first locking pivotal assembly including a first tube and a first coil spring having a first locked position for restricting pivotal movement of said support platform relative to said support arm, and a first unlocked position permitting pivotal movement of said support platform relative to said support arm, said first tube defining a first axis about which said support platform is pivotal relative to the base structure, said first coil spring is disposed around said first tube, an internal diameter of said first coil spring in a relaxed condition is less than an outside diameter of said first tube, a first end of said first coil spring is attached to said first tube, a second end of said first coil spring being connected to said release mechanism;

a second locking pivotal assembly at said second end of said support arm, said second locking pivotal assembly including a second tube and a second coil spring having a second locked position for restricting pivotal movement of said support arm relative to the base structure, and a second unlocked position permitting pivotal movement of said support arm relative to the base structure; said second tube defining a second axis about which said support platform is pivotal relative to the base structure, said second coil spring is disposed around said second tube, an internal diameter of said second coil spring in a relaxed condition is less than an outside diameter of said second tube, a first end of said second coil spring is attached to said second tube, a second end of said second coil spring being connected to said release mechanism;

a release mechanism operable to adjust said first coil spring from said first locked position to said first unlocked position; and operable to adjust said second coil spring from said second locked position to said second unlocked position; and a counterbalancing spring is disposed in and connected to at least one of said first tube and said second tube.

5. The support device of claim 3, wherein said first coil spring has a first spring constant, and said second coil spring has a second spring constant, said second spring constant being greater than said first spring constant.

6. The support device of claim 1, further comprising:

a tube defining an axis about which said support platform is pivotal relative to the base structure, said tube having an outside diameter;

said coil spring being disposed around said tube, said coil spring having an inside diameter, said inside diameter of said coil spring in a relaxed condition being less than said outside diameter of said tube;

a first end of said coil spring being attached to said tube; and a second end of said coil spring being connected to said release mechanism.

7. The support device of claim 6, wherein a counterbalancing spring is disposed in and connected to said tube.

8. A computer monitor support device for attachment to a base structure, comprising:

a computer monitor support platform;

a support arm having a first end pivotally connected to said computer monitor support platform, and a second end adapted for a pivotal connection to the base structure;

a locking mechanism including a spring actuated locking device having a cylindrical surface and a coil spring adapted for frictional engagement with said cylindrical surface, for securing said support platform in a selected position; and a release mechanism adapted and arranged for releasing said coil spring from frictional engagement with said cylindrical surface.

9. The computer monitor support device of claim 8, wherein said release mechanism includes a lever and a cable connected to said lever and to said spring actuated locking device.

10. A computer monitor support device for attachment to a base structure, comprising:

a computer monitor support platform, a support arm having a first end pivotally connected to said computer monitor support platform, and a second end adapted for a pivotal connection to the base structure;

a locking mechanism including a spring actuated locking device having a cylindrical surface and a coil spring adapted for frictional engagement with said cylindrical surface, for securing said support platform in a selected position; and a release mechanism including first and second levers, and a cable and pulley system interconnected between said first and second levers and said spring actuated locking device, said release mechanism adapted and arranged for releasing said coil spring from frictional engagement with said cylindrical surface.

11. The computer monitor support device of claim 10 wherein said release mechanism includes a toggle wheel connected to said spring actuated locking device and to said cable and pulley system.

12. The computer monitor support device of claim 10, wherein said cable and pulley system includes a first cable disposed between and interconnecting said first and second levers, and a second cable interconnecting said first cable and said spring actuated locking device.

13. The computer monitor support device of claim 12 wherein said release mechanism includes a toggle wheel connected to said spring actuated locking device and to said second cable.

14. The computer monitor support platform of claim 12, further comprising a sliding link between said first cable and said second cable.

15. A locking pivotal link between a computer monitor support platform and a support arm connected to said support platform, comprising:
- a pivotal joint between the computer monitor support platform and the support arm, including a cylindrical element having an outside surface;
- a coil spring disposed around said cylindrical element; said coil spring having an inside diameter of a size for creating an interference fit between said coil spring and said outside surface of said cylindrical element; said coil spring having a first end and a second end, said first end being fixed in position relative to said cylindrical element; and
- a release mechanism connected to said second end, said release mechanism adapted for movement of said second end to expand said internal diameter of said coil spring, relieving the interference fit between said coil spring and said cylindrical element.

16. The locking pivotal link defined in claim 15, further comprising a counterbalancing spring connected to said cylindrical element.

17. The locking pivotal link defined in claim 15, wherein said cylindrical element is a tube, and said counterbalancing spring is disposed in said tube.

18. A locking pivotal link between a computer monitor support platform and a support arm connected to said support platform, comprising:
- a pivotal joint between the computer monitor support platform and the support arm, including a cylindrical element having an outside surface;
- a coil spring disposed around said cylindrical element; said coil spring having an inside diameter of a size for creating an interference fit between said coil spring and said outside surface of said cylindrical element; said coil spring having a first end and a second end, said first end being fixed in position relative to said cylindrical element; and
- a release mechanism including a first release paddle and a second release paddle, a cable and pulley system disposed between said first release paddle and said second release paddle, and a connection between said cable and pulley system and said second end, said release mechanism connected to said second end, said release mechanism adapted for movement of said second end to expand said internal diameter of said coil spring, relieving the interference fit between said coil spring and said cylindrical element.

19. The locking pivotal link defined in claim 15, further comprising a first bar, a second bar spaced from said first bar, and said cylindrical element being attached to said second element and extending therefrom toward said first element.

20. A locking pivotal link between a first member and a second member, comprising:
- a pivotal joint between the first member and the second member, including a cylindrical element having an outside surface, said cylindrical element rotatably interconnecting said first member relative to said second member;
- a coil spring disposed around said cylindrical element, said coil spring having a diameter sized for creating an interference fit between said coil spring and said cylindrical element; said coil spring having a first end and a second end, said first end being fixed in position relative to said cylindrical element; and
- a release mechanism connected to said second end, said release mechanism adapted for movement of said second end to change said diameter and relieve the interference fit between said coil spring and said cylindrical element.

21. The locking pivotal link defined in claim 20, further comprising a counterbalancing spring connected to said cylindrical element.

22. The locking pivotal link defined in claim 21, wherein said cylindrical element is a tube, and said counterbalancing spring is disposed in said tube.

23. A locking pivotal link between a first member and a second member, comprising:
- a pivotal joint between the first member and the second member, including a cylindrical element having an outside surface, said cylindrical element rotatably interconnecting said first member relative to said second member;
- a coil spring disposed around said cylindrical element, said coil spring having a diameter sized for creating an interference fit between said coil spring and said cylindrical element;
- said coil spring having a first end and a second end, said first end being fixed in position relative to said cylindrical element; and
- a release mechanism including a first release paddle and a second release paddle, a first cable and pulley system disposed between said first release paddle and said second release paddle, and a cable connection between said first cable and pulley system and said second end, said release mechanism connected to said second end, said release mechanism adapted for movement of said second end to change said diameter and relieve the interference fit between said coil spring and said cylindrical element.

24. The locking pivotal link defined in claim 20, further comprising a first bar, a second bar spaced from said first bar, and said cylindrical element being attached to said second bar and extending therefrom toward said first bar.

* * * * *